(12) United States Patent
Pendleton et al.

(10) Patent No.: US 9,258,195 B1
(45) Date of Patent: Feb. 9, 2016

(54) LOGICAL TOPOLOGY VISUALIZATION

(75) Inventors: Amy S. Pendleton, Austin, TX (US);
Pramod Madabhushi, Austin, TX (US);
H. Edward Hassinger, Austin, TX (US)

(73) Assignee: Shoretel, Inc., Sunnyvale, CA (US)

( * ) Notice: Subject to any disclaimer, the term of this patent is extended or adjusted under 35 U.S.C. 154(b) by 356 days.

(21) Appl. No.: 13/569,248

(22) Filed: Aug. 8, 2012

(51) Int. Cl.
*H04L 12/24* (2006.01)
*H04L 29/08* (2006.01)

(52) U.S. Cl.
CPC ............... *H04L 41/22* (2013.01); *H04L 41/12* (2013.01); *H04L 67/36* (2013.01)

(58) Field of Classification Search
CPC .......... H04L 41/22; H04L 41/12; H04L 67/36
USPC .................... 715/736, 734, 735, 737
See application file for complete search history.

(56) References Cited

U.S. PATENT DOCUMENTS

| | | | |
|---|---|---|---|
| 6,477,572 B1 * | 11/2002 | Elderton et al. | 709/224 |
| 6,789,090 B1 | 9/2004 | Miyake et al. | |
| 6,952,208 B1 * | 10/2005 | Arquie et al. | 345/440 |
| 7,315,985 B1 * | 1/2008 | Gauvin et al. | 715/734 |
| 8,332,782 B1 * | 12/2012 | Chang et al. | 715/853 |
| 2002/0143936 A1 * | 10/2002 | Yu | 709/224 |
| 2002/0147805 A1 * | 10/2002 | Leshem et al. | 709/223 |
| 2004/0061701 A1 * | 4/2004 | Arquie et al. | 345/440 |
| 2005/0044268 A1 | 2/2005 | Johnston-Watt et al. | |
| 2006/0156280 A1 * | 7/2006 | Chen et al. | 717/105 |
| 2006/0203747 A1 | 9/2006 | Wright et al. | |
| 2007/0044032 A1 * | 2/2007 | Mollitor et al. | 715/764 |
| 2007/0113185 A1 * | 5/2007 | MacLeod et al. | 715/734 |
| 2007/0204231 A1 * | 8/2007 | Cunningham et al. | 715/734 |
| 2008/0239985 A1 | 10/2008 | Karve et al. | |
| 2009/0003211 A1 | 1/2009 | Akyamac et al. | |
| 2009/0327903 A1 * | 12/2009 | Smith et al. | 715/737 |
| 2010/0058165 A1 * | 3/2010 | Bhattacharya et al. | 715/227 |
| 2010/0328421 A1 * | 12/2010 | Khot et al. | 348/14.08 |
| 2011/0289232 A1 * | 11/2011 | Douceur et al. | 709/233 |
| 2012/0036484 A1 * | 2/2012 | Zhang et al. | 715/853 |
| 2012/0069770 A1 | 3/2012 | Hiscock | |

FOREIGN PATENT DOCUMENTS

| | | |
|---|---|---|
| EP | 0 739 110 A2 | 10/1996 |
| WO | WO 2007/062670 A1 | 6/2007 |
| WO | WO 2011/116673 A1 | 9/2011 |

* cited by examiner

*Primary Examiner* — Ajay Bhatia
*Assistant Examiner* — Justin R Blaufeld
(74) *Attorney, Agent, or Firm* — Tarolli, Sundheim, Covell & Tummino LLP

(57) ABSTRACT

A graphical user interface (GUI) for visualization of a logical topology of a system can include a plurality of node user interface elements to represent respective components in the system. The GUI can include a plurality of link user interface elements, each connected between an associated pair of the node user interface elements to represent a logical connection between a given component and at least one other component in the system. In response to a user input for a selected node user interface element, at least a portion of the plurality of link user interface elements can be modified to represent the logical connectivity and associated status such as from a perspective of the component represented by the selected node user interface element.

30 Claims, 11 Drawing Sheets

US 9,258,195 B1

LOGICAL TOPOLOGY VISUALIZATION

TECHNICAL FIELD

This disclosure relates to visualization of a logical topology, such as for a communication or other network system.

BACKGROUND

A network can be configured to perform various types of functions. The operation of a network depends on cooperation between different components that collectively form the network. In order to ensure that the network and its associated components operate within expected operating parameters, diagnostic tools can monitor operation of components within the network and provide corresponding information to users. Many tools available for monitoring networks tend to be cumbersome, and may not provide an easily understandable and comprehensive view of network operation.

SUMMARY

This disclosure relates to visualization of a logical topology, such as for a communication or other network system In one example, a graphical user interface (GUI) can be provided for visualization of a logical topology of a system. The GUI can include a plurality of node user interface elements to represent respective components in the system. The GUI can also include a plurality of link user interface elements, each connected between an associated pair of the node user interface elements to represent a logical connection between a given component and at least one other component in the system. In response to a user input for a selected node user interface element, at least a portion of the plurality of link user interface elements can be modified to represent the logical connectivity and associated status from a perspective of the component represented by the selected node user interface element.

In another example, a non-transitory computer readable medium can store instructions for performing a method that includes accessing status data for components of a network system, the status data including connectivity status information aggregated for at least some of the components of the network system. An interactive visualization of a logical topology for the network system can be dynamically generated based on the accessed status data. The interactive visualization of the logical topology can include nodes and links arranged as a radial graph, in which the nodes represent components operating in the network system and associated status thereof, and the links represent connectivity between related components and associated connectivity status.

In yet another example, a computer-implemented method can include accessing a monitoring database to acquire status information for a plurality of components in a telecommunication system. A radial graph can be generated based on the acquired status information. The radial graph can include a plurality of nodes representing the plurality of components, and links representing logical connections and associated status for the plurality of components. In response to a user input selecting a given node of the plurality of nodes, the links in the radial graph can be dynamically modified to represent connectivity status information in the radial graph, based on the acquired status information, such as from a perspective of the selected given node.

DETAILED DESCRIPTION

Figure 1:
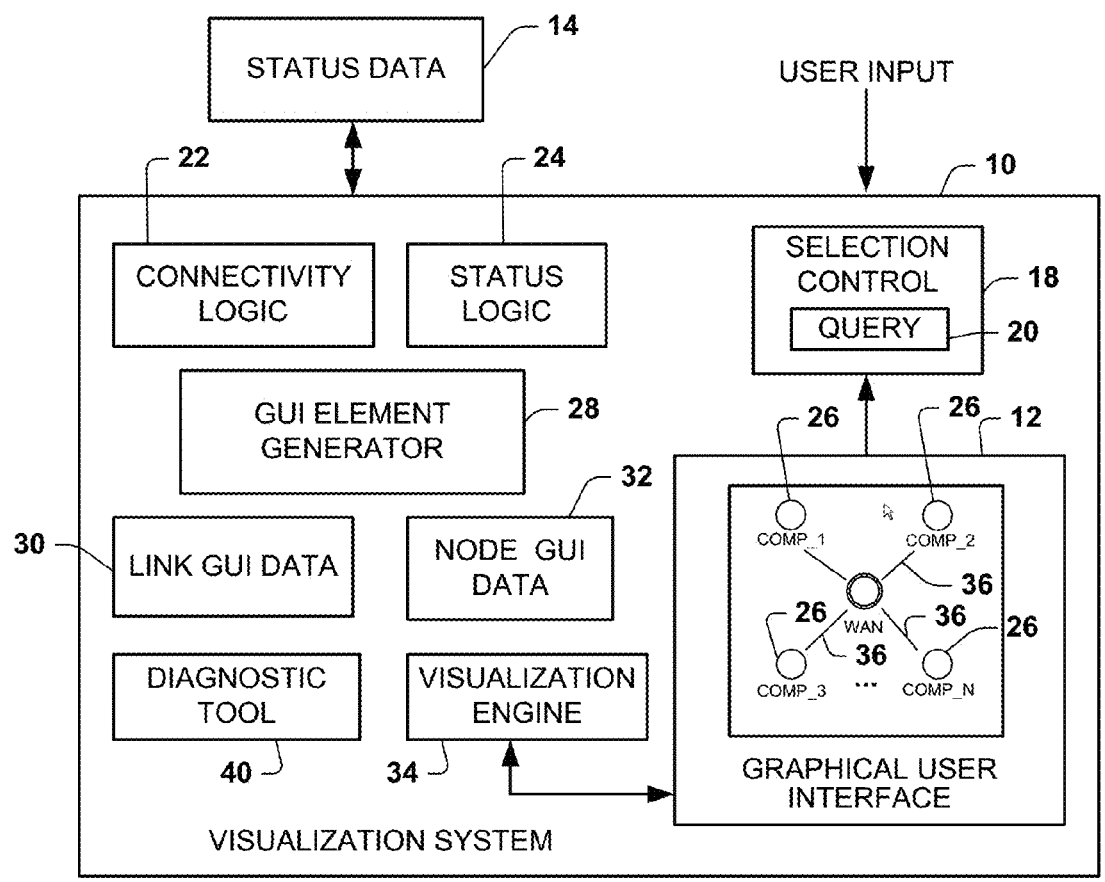
FIG. 1 depicts an example of a diagnostic and monitoring system that includes a graphical user interface for visualizing a logical topology.

This disclosure relates to visualization of a logical topology, such as for a network or other communication system. The visualization can be provided as a graphical user interface (GUI) that can present physical and logical relationships along with connectivity status information for the system in an interactive manner. For example, the GUI can be implemented as a radial or other type of graph that includes a plurality of nodes and links arranged to represent physical and logical components and related status information for the system. Each of the nodes can represent a respective component in the system and the links can be connected between the nodes to represent logical connectivity between each given component and one or more other components within the system. Each link that is visualized in the GUI can represent one or more connections (physical and/or logical connections) and status for the connection that is represented by the link. In some examples, the connectivity represented by a given link can correspond to an aggregate connectivity and status for a connection between the components represented by the nodes that are connected by the given link. Additionally or alternatively, the connectivity represented by a link can correspond to network as well as application level protocol connectivity between various services running on the components.

The visualization can be implemented as part of a diagnostic and monitoring tool and be scalable to visualize logical topology for network system at various levels of granularity. The visualization can be generated for different types of users, including a large enterprise system, as well as one or more separate networks (e.g., as may be hosted or managed by a service provider). Additionally, the visualization can dynamically adapt to provide real-time monitoring and diagnostic information from a high level system overview down to detailed component-level configuration and connectivity information.

As used herein, the term "component" can encompass a physical component in a system (e.g., a device, application or service operating in the system), a logical component in a system or a logical group of components, which can include a combination of logical and physical components. In the context of a visualization for a telecommunication system, for example, a given node in the system can represent one or more components including a site, a switch, a server, a phone, a trunk group and the like. Further to the telecommunications example, a site can include a logical group of servers and one or more producer components, such as one or more switches. Additionally, different switches for a given site can be managed by different ones of the servers and/or a given server can be shared by more than one site.

A given node in a visualization can also represent a logical grouping of one or more different types of components that in aggregate form a system or subsystem. A service provider or other entity thus can utilize the diagnostic and monitoring system for a plurality of different customers, each of which customers' systems can be represented, in some examples, as a corresponding node that can be expanded to visualize additional details of the underlying logical topology as disclosed herein. Thus, a given node can represent various logical constructs that can accurately reflect components operating according to various different topologies that may be implemented for one or more systems for which the diagnostic and monitoring is to be performed.

FIG. 1 depicts an example of a diagnostic and monitoring system 10 that can be implemented to provide a GUI 12 to facilitate visualization of a logical topology for a network system. The GUI can be implemented as a thick or thin (e.g., web based) client, for example. As disclosed herein, the network system can be a communications system or other form of network system in which a plurality of components can communicate data (e.g., including voice or other forms of data) and/or control information. A network system may also represent a plurality of independent systems The diagnostic and monitoring system 10 is configured to access system status data 14, such as can be stored in memory. The memory can be implemented, for example, as volatile memory (e.g., random access memory), nonvolatile memory (a hard disk drive, a solid state drive, flash memory or the like) or a combination thereof. For example, the system status data 14 can be maintained in a central or distributed database that is populated with status data aggregated from each of a plurality of components that collectively form the network system.

The diagnostic and monitoring system 10 is configured to perform diagnostic and monitoring functions for the associated network system based on the system status data 14. For example, the system status data 14 can be collected by one or more processes or services from various producer components (e.g., servers or other devices) that are distributed throughout the system (e.g., one or more networks) that is being monitored. The status collection can occur by aggregating status information from such producers and/or producers or related monitoring services can push status information directly to the status data 14. In some examples, the status data can represent real-time status such that the resulting visualization generated based on the status data likewise presents real time status information to the user.

The diagnostic and monitoring system 10 can include a selection control 18 that is configured to access relevant portions of the system status data 14 for use in generating the GUI 12. For example, the selection control 18 can construct a query 20 that is utilized to access and retrieve pertinent system status data 14. In this way, nodes and links visualized in the GUI 12 can be dynamically modified, according to the retrieved (e.g., updated) system status data to visualize status and connectivity information responsive to a user input. The visualization mode and perspective of the information presented in the GUI can be established by display parameters, which can include default parameters and/or be responsive to a user input. For instance, a user input can include selection data corresponding to a user interaction with one or more elements of the GUI 12.

The monitoring system 10 can include connectivity logic 22 and status logic 24 programmed to determine connectivity and status information based on the status data 14 that is accessed in response to the constructed query 20 and/or default parameters (e.g., including visualization level). The connectivity logic 22 and status logic 24 can be implemented as a single integrated method. For example, connectivity logic 22 can analyze the system data that is returned in response to the query to ascertain logical and/or physical connections for a set of components in the network system. As mentioned above, such components may include hardware and/or software (e.g., application or services) operating in the network system. The status logic 24 can ascertain the status of nodes and connectivity for each of the components. For instance, the status logic 24 can employ the results of the connectivity logic (e.g., a set of components) to determine status associated with each of the components and its respective connections. In some examples, the status can be aggregated at different levels of hierarchy depending upon the level of visualization (e.g., viewing mode) that has been selected for the GUI 12. A given connection can thus correspond to an aggregate logical connection associated with a given component, which may depend on the level of visualization presented in the GUI 12.

As disclosed herein, the respective components and the status for each of the components can be represented in the GUI 12 as node user interface elements (also referred to as nodes) 26. The connections between components and associated connectivity status can be represented as link user interface elements (also referred to herein as links) 36.

Once the relevant connectivity and status has been ascertained, a GUI element generator 28 is programmed to generate link GUI data 30 and node GUI data 32. The GUI element 28 can provide the link GUI data 30 and node GUI data 32 based upon the connectivity and status information that has been determined by the logic 22 and 24. The diagnostic and monitoring system also includes a visualization engine 34 that is configured to generate a visualization that is presented in the GUI 12. The visualization engine 34 can render the graphical representation of the node user interface elements 26 and link user interface elements 36 in a graph according to the link GUI data 30 and node GUI data 32. Each node and link can be assigned corresponding status data (e.g., in the link GUI data 30 and node GUI data 32) that is used by the visualization engine 34 to control its appearance in the GUI 12. For instance, different ranges of status values can be provided with different graphical features to graphically represent status information. As disclosed herein, the status of each node 26 and link 36 in the GUI further can represent an aggregate status that represents the status of multiple connections from the component represented by the selected node into the network system. The connectivity and status information can also be dynamically modified responsive to a user input.

By way of example, a node can represent a logical group of plural components such that the status indicated by the node GUI element 26 can represent the combined status components represented thereby. Similarly, a link can represent one or more logical connections in the network system such that the status indicated by the link GUI element can demonstrate status according to each connection that it represents in the GUI. For instance, two or more different colors can be assigned by the GUI element generator 28 to node and link GUI elements 26 and 36 to visually differentiate different types of status depending on the determined status for each link or node. The status and the colors or other means of visual differentiation can be defined by predetermined service codes, for example, which can also be implemented in a manner to comply with governmental regulations (e.g., Section 508 of the Rehabilitation Act of 1973 or similar regulations throughout the world). For instance, one or more different features, such as different graphical and text-based indicators as well as assistive technology (e.g., text labels and descriptors for graphical indicators, screen readers and refreshable Braille displays and the like), can be applied to each node and link to visually represent and differentiate relative status and logical connectivity for each respective node and link. The particular features utilized to differentiate such status and connectivity information can be user selectable in response to a user input.

For the example of status for a node, red can indicate when one or more components (e.g., switches and/or servers) are out-of-service. Yellow can be used to indicate when one or more components (e.g., switches and/or servers) are impaired, but not out of service. Green can be utilized when all switches and servers are in service and functioning within expected operating parameters. For the example of connectivity status represented by a link, a similar color scheme can be utilized. For instance, a green link can indicate that a selected component can connect to the other component (or components) represented by the node to which the link connects (e.g., a switch, a server or the system generally). A red link can indicate that a selected component cannot connect to the other component(s) represented by the node to which the link connects. In some examples, the links can indicate unidirectional connectivity status and in other examples, the link can indicate bidirectional connectivity status. Audible or other types of perceptible indicators can also be provided to distinguish different types of status, as may be appropriate.

Additionally, in response to another user input, the selection control 18 can be programmed to adjust the query 20 such that connectivity logic 22 and status logic 24 can re-compute status (e.g., connectivity and/or operating status) commensurate with the user input. For example, in response to a user selecting a given node, the connectivity and status logic 22 and 24 can ascertain connectivity and status information from a perspective of the selected node based on the status data 14. The GUI element generator can also compute updated link GUI data 30 and assign corresponding connectivity status from the perspective (e.g., as seen by) the selected node 26. In this way, the links generated for the selected node can represent one-way (e.g., unidirectional) connectivity, such as corresponding to the status of connectivity from the selected node to other components to which it may be connected.

As an example, from the perspective of a given selected node, such node may be capable of sending data and appear to have status indicator that its connectivity information is within expected operating conditions (e.g., green color indicating all connections are within nominal operating conditions—good). Even if such unidirectional status may be fine (e.g., within desired operating parameter) from the perspective of the selected node, the connectivity associated with this selected respective node may in fact be negative from a perspective of another node in the network system, such as if the selected node incapable of receiving messages. Thus, the connectivity status between two nodes can be different depending on the perspective of the different nodes.

The system 10 can also include a diagnostic tool 40 that is configured to access diagnostic functions and methods that can be initiated in response to a user input. The diagnostic functions and methods can be implemented in the system or otherwise be accessible. For example, a user can activate the diagnostic tool 40 to perform a diagnostic function in response to selecting one or more node user interface element 26 or link user interface element 36 such that the diagnostic function is performed on the physical components represented by the selected node user interface element and/or link user interface element. For example, the diagnostic tool 40 can utilize application program interfaces (API) that specify the physical components and/or connections on which selected diagnostics are to be performed. The specified components and connections can be derived from the logical component and connectivity information that is visualized in the GUI 12. By integrating diagnostic tools or at least access to the diagnostic tools with the logical topology visualization, the process of troubleshooting and diagnosing problems in the physical system can be greatly facilitated. For example, diagnostics can be implemented in a variety of ways such as by issuing diagnostic commands or functions on a component or group of components to obtain additional information about services running on such components. As another example, multiple nodes can be selected and synthetic call or other data traffic can be generated between nodes to simulate logical connectivity between components in the selected nodes. Other diagnostic functions may also be implemented, such as to measure performance of the node or the underlying transport mechanism.

It is to be understood that the various functions and logic of the diagnostic and monitoring system 10 can be stored in a non-transitory computer-readable medium as machine readable instructions. The functions of the diagnostic and monitoring system 10 can also be implemented as a method executing on a computer. For instance, a processor can access memory that stores instructions and data corresponding to the diagnostic and monitoring system 10 (e.g., including the GUI 12, selection control 18, connectivity logic 22, status logic 24, GUI element generator 28, visualization engine 34 and diagnostic tool 40). The processor can execute the instructions to perform the various functions in whole or in part, as disclosed herein.

In view of the foregoing functional description of the diagnostic and monitoring system 10 and the GUI 12 in relation to FIG. 1, various features will be better appreciated with respect to FIGS. 2-13. FIGS. 2-13 provide examples of different functions of with the GUI 12 that can be utilized to visualize the logical topology of a system. In several of the examples in FIGS. 2-13, the network system is described in the context of a telecommunication system; however, the GUI 12 is not limited to use with the telecommunication system but is equally applicable to other computer network systems or groups of multiple systems that can benefit from a logical topology visualization. Thus, as used herein, the term "site" as applied to the nodes can correspond to any logical aggregation of one or more components including an aggregation of entire system or group of systems. Additionally, like reference numbers are used to refer to similar components throughout the various figures.

Figure 2:
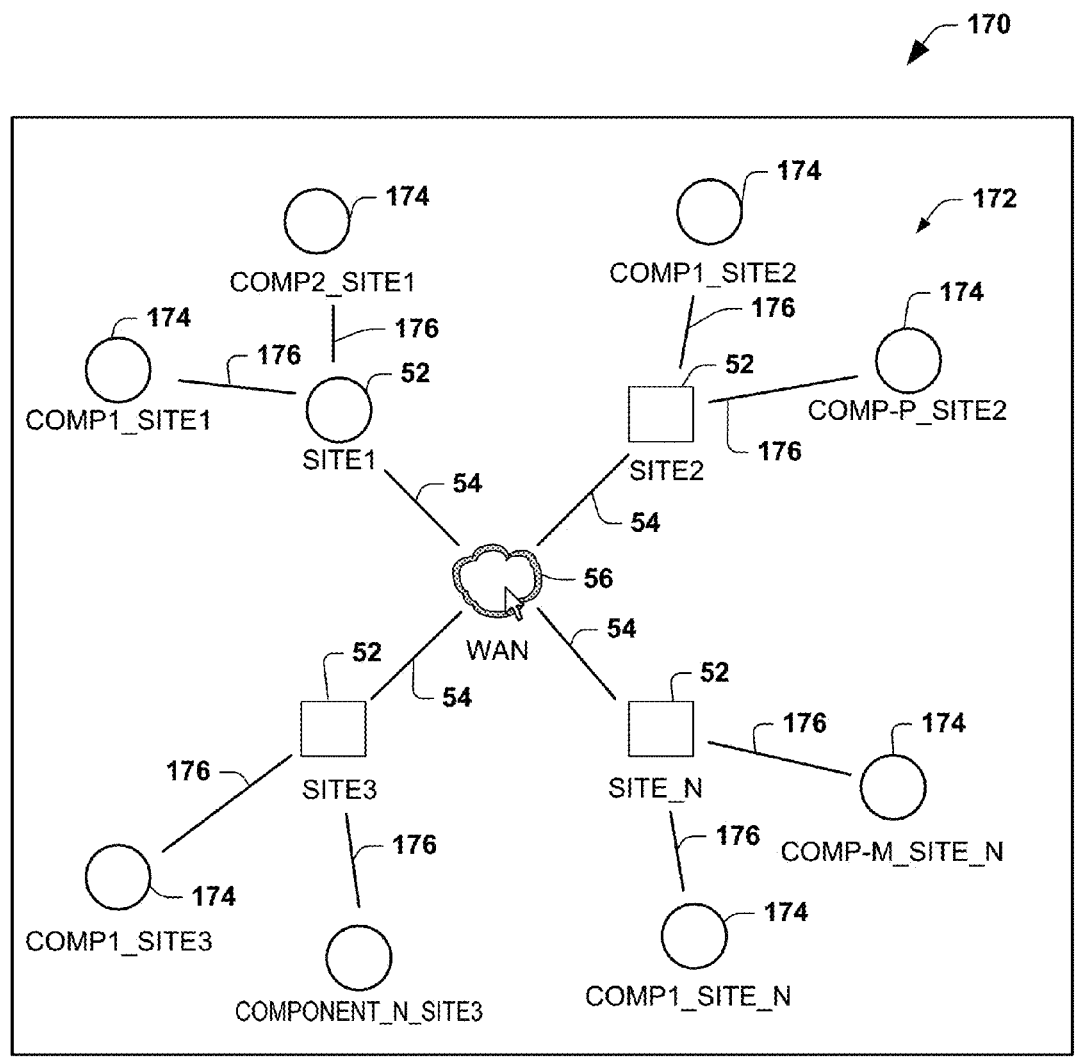
FIG. 2 depicts an example of a graphical user interface demonstrating a fully-expanded system visualization.

FIG. 2 depicts an example of a visualization GUI 170 demonstrating a graph visualization for an expanded system view of all components in the network system. The GUI 170 includes a plurality of nodes 52 each of which corresponds to a respective site demonstrated at Site 1, Site 2, Site 3, through Site N, where N is a positive integer denoting the number of sites in the system. Each site node 52 can represent a logical construct that includes a plurality of components that operate in the system. Each of the site nodes 52 can be connected to an aggregation node 56 via a corresponding link 54. The aggregation node 56 in this example provides a center of a radial graph demonstrated by the GUI 170. For example, a site can include a group of components that are physically co-located or some components can be distributed throughout the system and be logically grouped together for operation for a particular purpose. For the telecommunication industry, a site node can represent physical and logical components for an enterprise office, a division or group of offices. The hardware components represented by the site node, however need not be physically located at the same location and may be distributed across the telecommunication network.

In this example, the aggregation node 56 can represent a virtual aggregation point through which each of the plurality of nodes 52 can be logically connected in the GUI 170. The aggregation node 56 thus operates as a logical convergence point for the network system and can thus represent a logical construct such as wide area network (WAN). In this way, a given link 54 from a corresponding site node 52 to the aggregation node 56 can graphically represent a total aggregate connectivity from all components within the site node 52 to the remainder of the network system. The number of an extent of physical connections and components represented by such link can depend on the individual physical and logical configuration for a given site.

Each node 52 and each link 54 can also visually represent status information according to a predefined status code. For example, status can be indicated by a plurality of colors codes, such as green, yellow and red. As another example, different line styles can be employed as status differentiators. Each site node can further have a color that represents an aggregation of component status that is attributable to each respective site. Similarly, each link 54 can include a color that represents the aggregate connectivity status for a given site to the rest of the system, which can include an aggregated switch-to-switch status, switch-to-server status as well server-to-service connectivity status. The status information can be determined as disclosed herein with respect to FIG. 1. As an alternative or in addition to using color coding to indicate status information, other graphical features or text information can be utilized to convey status information in the GUI 170. For example, different thickness of lines and/or lengths of links can be utilized to differentiate between different levels of connectivity status. Other forms of graphical icons or graphical features can also be utilized to demonstrate status for each of the nodes 52 and links 54. Since the links 54 to the aggregation node 56 represent aggregate connectivity, the status indicated by each such link thus can represent corresponding aggregate status for such connectivity. Different types of nodes can also be represented differently in the GUI 170, such as by using different icons or other graphical features to visually differentiate different types of components or aggregations. In the examples of FIGS. 2-13, the aggregation node is demonstrated as a cloud, site nodes are demonstrated as rectangles and other component nodes are demonstrated as circles. Various other graphics could be utilized to represent nodes in other examples, including adjusting node size according to one or more operational parameters (e.g., connectivity or number of components or the like).

By way of further example, each site can include any number of one or more components that can be represented by corresponding component nodes 174 in the expanded view of FIG. 2. Additionally, each of the component nodes 174 is connected via a corresponding link 176 to its associated site node. Each link between the component node 174 and its corresponding site node 52 thus represents the logical connectivity and associated status from the component to the rest of the system via the site node 52. The expanded component and connectivity status information represented for each site can be similar to that disclosed herein below in relation to FIG. 6 (e.g., the expanded Site 3 node 52). That is each node 52, 174 and each link 54, 174 can include a status indicators (e.g., according to a predefined color code) to indicate corresponding status information.

The GUI 170 can be activated in response to a user input selecting such view (e.g., via drop down menu 80 of FIG. 4) or in response to expanding each site node 52 individually as disclosed herein. In other examples the expanded view of the GUI can be a default initial visualization provided by the diagnostic and monitoring system.

In the following examples of FIGS. 3-13, where reasonable, like reference numerals are utilized to refer to GUI elements that have been introduced in FIG. 2. While some of the GUI elements, such as the control window 60, are not shown in each of the figures, it is to be understood and appreciated that such GUI elements could be provided and implemented throughout the various views. For purposes of simplicity of explanation such features have been omitted.

Figure 3:
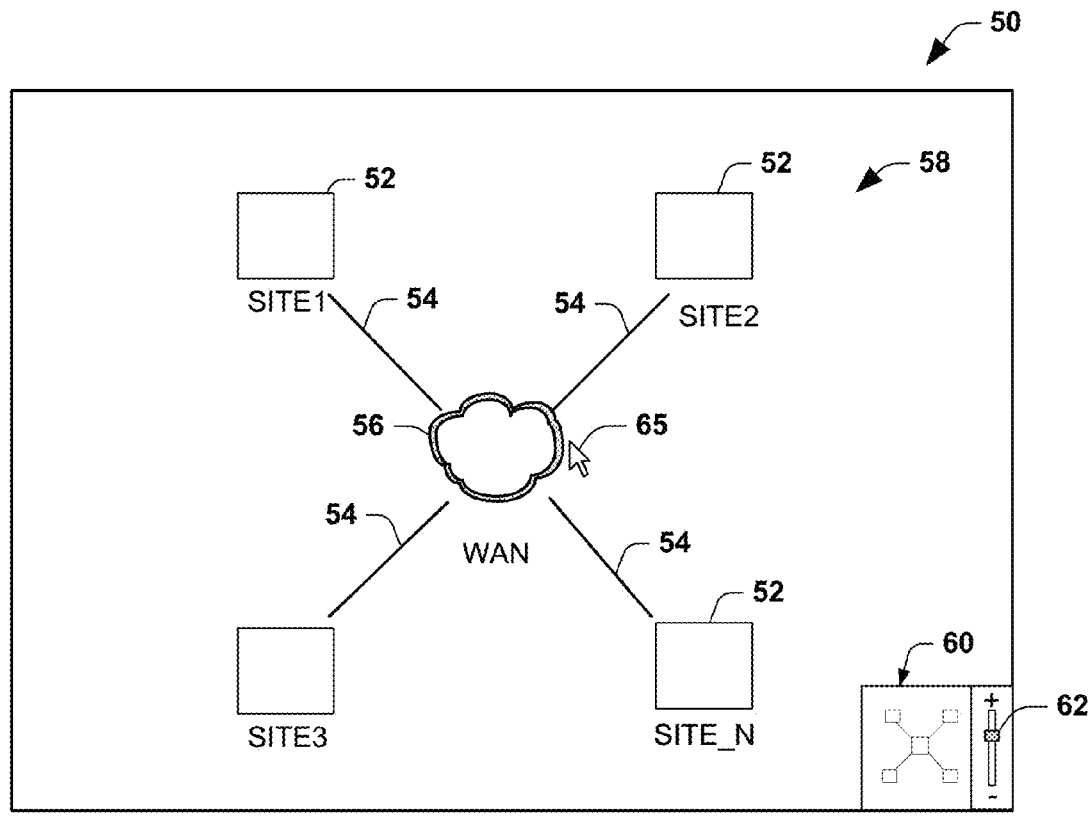
FIG. 3 depicts an example of a graphical user interface demonstrating a system level visualization.

FIG. 3 depicts an example of an interactive logical topology GUI 50. Similar to FIG. 2, the GUI 50 includes a plurality of nodes 52 each of which corresponds to a respective site demonstrated at Site 1, Site 2, Site 3, through Site N, where N is a positive integer denoting the number of sites in the system. Each site node 52 can represent a logical construct that includes a plurality of components that operate in the system.

The GUI 50 also includes a plurality of links 54 that connect each site node 52 with an aggregation node 56 to provide a corresponding radial graph 58. Each node 52 and each link 54 can also visually represent status information according to a predefined status code. For example, status can be indicated by a plurality of colors such as green, yellow and red for example, each site node can have a color that represents an aggregation of component status for each site. Similarly, each link 54 can include a color that represents the aggregate connectivity status for a given site to the rest of the system, which can include an aggregated switch-to-switch status, switch-to-server status as well server-to-service connectivity status. The status information can be determined as disclosed herein with respect to FIG. 1. As an alternative or in addition to using color coding to indicate status information, other graphical features or text information can be utilized to convey status information in the GUI 50. For example, different thickness of lines and/or lengths of links can be utilized to differentiate between different levels of connectivity status. Other forms of graphical icons or graphical features can also be utilized to demonstrate status for each of the nodes 52 and links 54.

As mentioned above, the node 56 corresponds to an aggregation node that represents a virtual aggregation point through which each of the plurality of nodes 52 can be logically connected in the GUI 50. The aggregation node 56 thus operates as a logical convergence point for the network system and can thus represent a logical construct such as wide area network (WAN). For example, if a logical topology of the GUI 50 were overlaid with an actual physical topology, the aggregation node 56 could be represented by a collection of edge routers within the network system. In this way, a given link 54 from a corresponding site node 52 to the aggregation node 56 represents a total aggregate connectivity from all components at the site node 52 to the remainder of the network system. The number of an extent of physical connections and components represented by such link can depend on the individual physical and logical configuration for a given site.

Since the GUI 50 is scalable to represent any size network system, the GUI can include controls such as to adjust the size logical topology that is represented in the GUI relative to the space in the screen. In the example of FIG. 3, the controls include a display control window 60 and a slide user element 62. The control window 60 can be utilized to adjust the relative position of the radial graph within the display window such as by employing a pointer user interface element 64. For example a user can employ the pointer 64 or other user interface element (e.g., touch screen) to select and drag the graph to a desired relative position within the control window 60. A user can also employ the slide user interface element via the pointer user interface element 64 or other means to selectively adjust the size of the graph 58 in window 60 (e.g., zoom in or zoom out).

As a further example, if a user sees a status for a given component or group of components, represented by nodes 52 or links 54 in the radial graph 58, is not functioning within expected operating parameters (e.g., yellow or red color indicators), a user can right click or otherwise select the user interface element to drill down and obtain additional information associated with its status. Such information can be provided for the selected node or link by way of other windows (e.g., a pop-up window) that provide detailed status information such as in the form of charts, tables, graphs or the like. Thus, the visualization GUI 50 facilitates ascertaining the source of malfunctions related to components and connectivity for the given network system.

In addition to displaying high level status associated with each of the respective sites via nodes 52 and connectivity status via the links 54, the GUI 50 can also display other types of status and notifications (e.g., alerts) associated with components or logical groups of components in the network system. For example, a display section can be provided to provide status information for connections, trunk groups, bandwidth, voice quality, switches and servers. This list is by no means exhaustive and can be customized according to user application requirements and network configuration. Similar to the nodes and links in the logical topology, additional information about a respective group or component can be obtained, for example, by selecting (e.g., double-clicking) a corresponding descriptor via the pointer user interface element 64 or other user interface feature.

Figure 4:
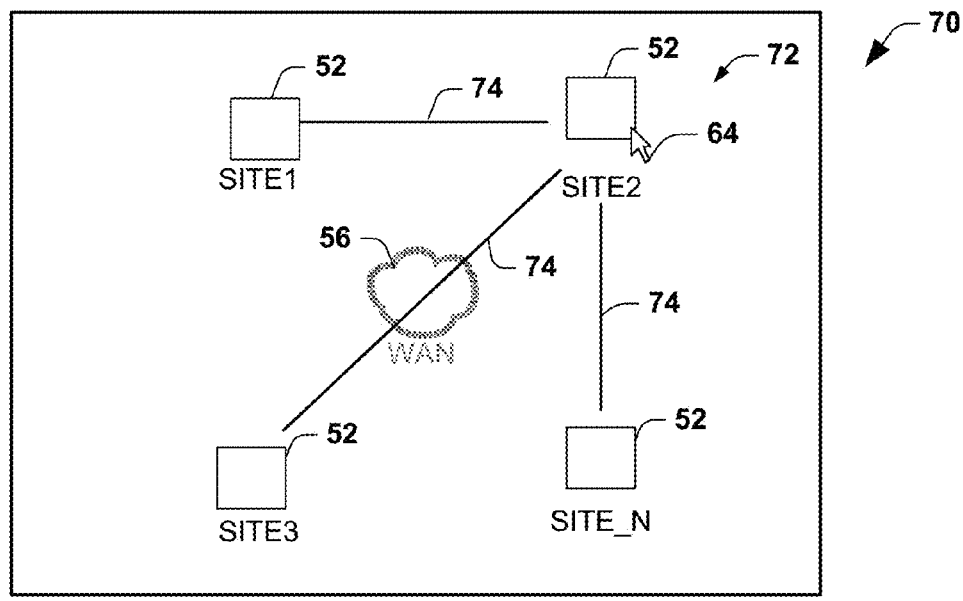
FIG. 4 depicts an example of a graphical user interface demonstrating a site-level visualization.

FIG. 4 depicts an example of a GUI 70 for visualizing a logical topology in which a given site (SITE2) node 52 has been selected in response to a user input, such as via the pointer GUI element 64. In response to selecting the node 52, the links demonstrated in the GUI can dynamically modified (e.g., from the view of FIG. 3 or another view) to represent the logical connectivity and associated status from the perspective of the component that is represented by the selected node 52. Thus, in this example, connectivity from the SITE2 node 52 is represented as link GUI elements 74 extending from the SITE2 node to each of the other site nodes 52 to form a corresponding radial graph 72. Since the SITE2 node has been selected, the links 74 each indicates an aggregate status from the combined set of the components at Site 2 relative to components at each of the other sites. For example, the connectivity status for each link 74 can include aggregate switch-to-switch, switch-to-server and server-to-server connectivity status. As shown in the example of FIG. 4, the link between the nodes of Site 2 and Site 3 passes through the aggregate node 56, which is no longer selected and operates as an inactive node. The aggregation node 56 could be rendered substantially transparent or eliminated from the view of FIG. 4. For sake of consistency, the aggregation node 56 will be demonstrated in a partially transparent rendering of figures for examples where is does not operate as a virtual aggregation point for logical connectivity.

Figure 5:
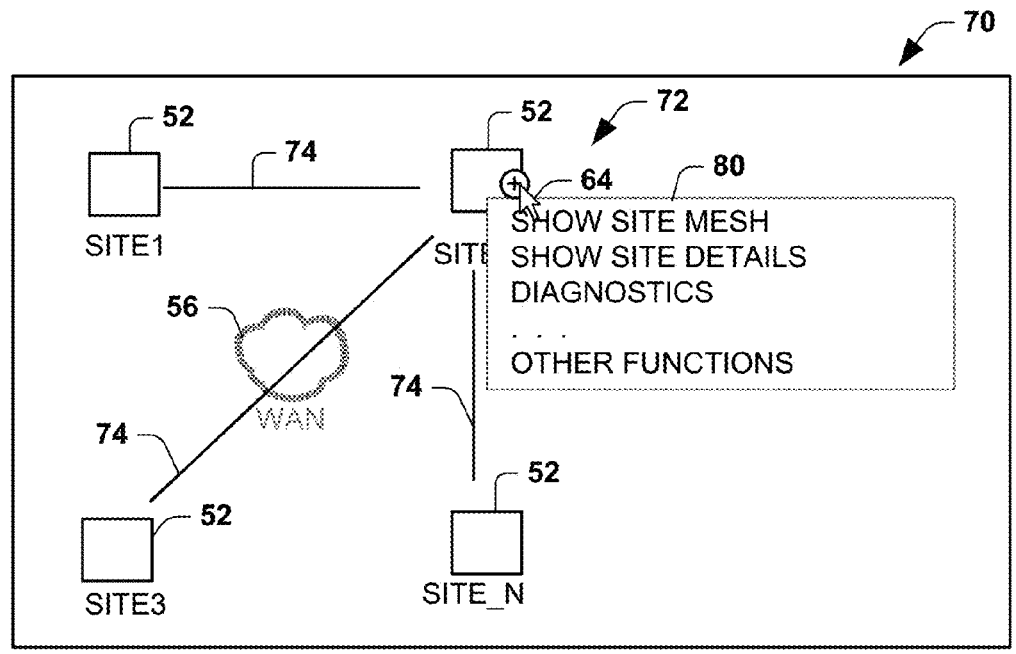
FIG. 5 depicts an example of a graphical user interface demonstrating GUI menu options associated with a selected node.

FIG. 5 depicts an example of the GUI 70 of FIG. 4 in which the SITE2 node 52 has been further selected to activate a corresponding drop down menu 80. In the example of FIG. 5, the drop down menu 80 can include a plurality of options for visualizing additional details or removing details from the visualized graph 72. In the example of FIG. 5, the drop down menu 80 includes a plurality of selectable functions including SHOW SITE MESH, SHOW SITE DETAILS, EXPAND SITE NODE, DIAGNOSTICS and OTHER FUNCTIONS. The user thus can select any of the additional functions and features to change the level of detail or obtain other types of information about displayed items. For instance, a user can quickly obtain additional information as well as perform diagnosing of operating conditions or connectivity for nodes from a given view. Similar options can be available by selecting any of the other nodes 52 or links 74, for example. Some examples of different views that can be accessed via the menu 80 are disclosed herein (see, e.g., FIGS. 2, 7, 11, 12 and 13).

Figure 6:
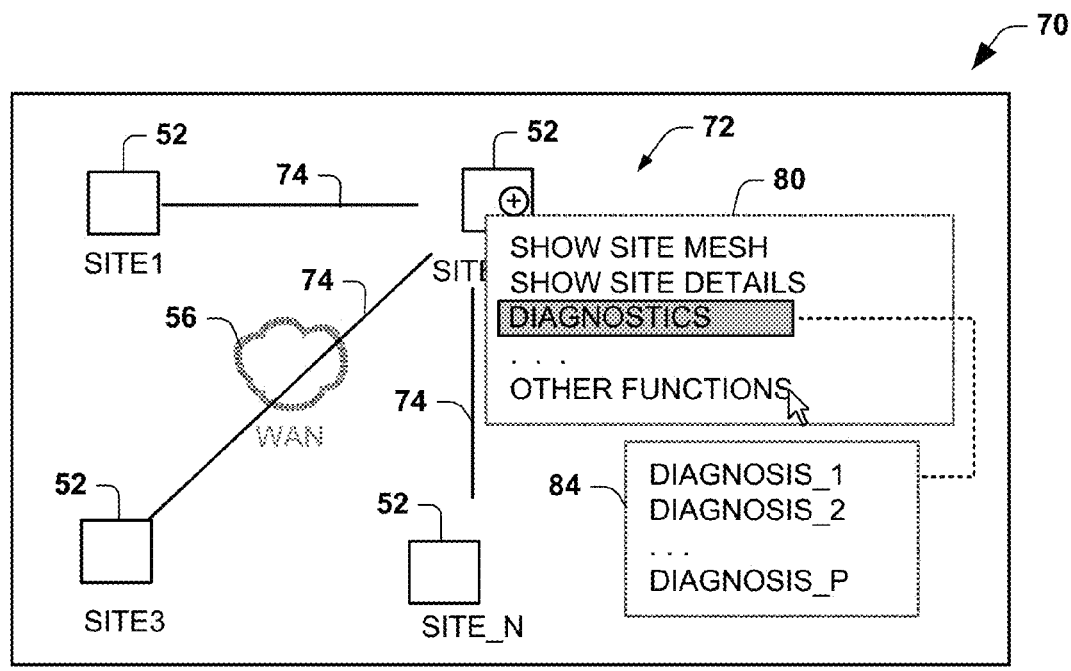
FIG. 6 depicts an example of a graphical user interface demonstrating diagnostic functions that may be implemented relative to a selected element.

FIG. 6 depicts an example in which the DIAGNOSTIC TOOL option from the menu 80 of FIG. 5 has been selected. The DIAGNOSTIC TOOL option can thus result in generating an additional menu 84 of diagnostic options that can include various diagnostic tools. A user can employ the pointer user interface element 64 to select one of the available diagnostic functions to be performed indicated as Diagnosis 1 through Diagnosis P, where P is a positive integer denoting the number of available diagnoses. The list of diagnoses that is available can be generated depending on the context of the selected node, such as may depend on the type of node and its associated connections. For example, in response to selecting a given diagnosis from the diagnostic menu 84, a user can be provided with additional options to define the parameters for the diagnosis. The diagnosis, for example, may automatically populate some or all parameters based upon the context of the selected site (SITE2) and status indicators that may be visualized in the graph 72. For instance, if the link between SITE2 and SITE_N indicates a connectivity failure, the diagnosis tool (e.g., tool 40 of FIG. 1) can automatically populate the diagnosis parameter fields to anticipate where a user will request the diagnosis to be performed. A user can also manually set the parameters and select components on which the diagnosis is to be performed via user input mechanisms.

Figure 7:
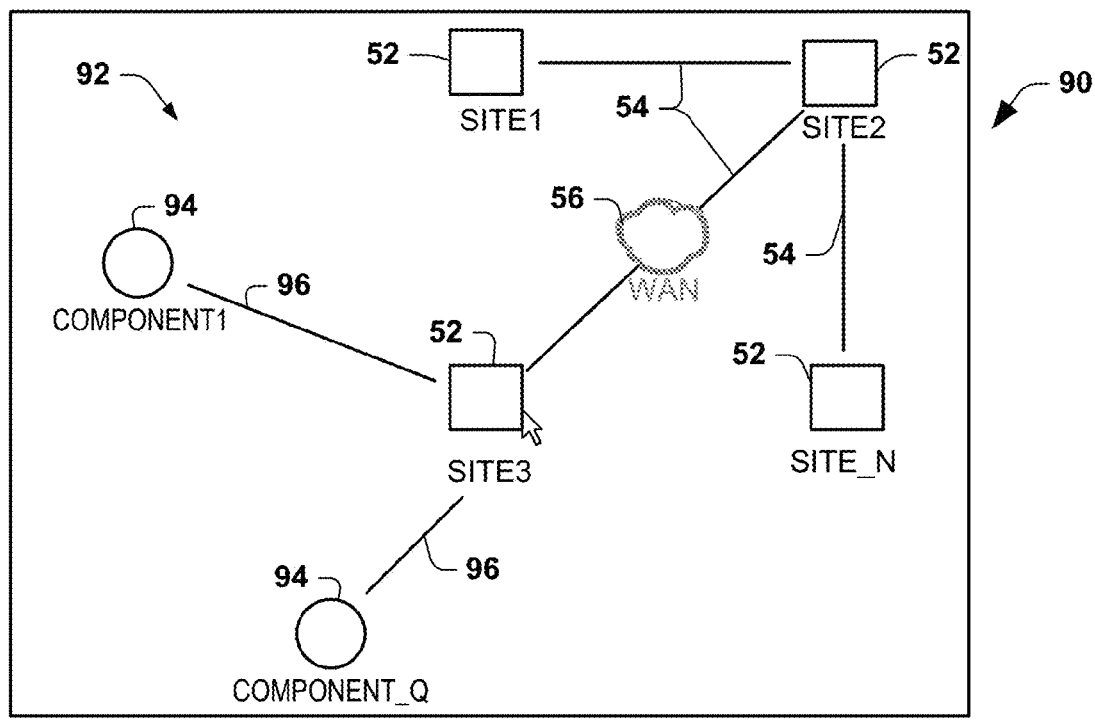
FIG. 7 depicts an example of a graphical user interface demonstrating an expanded view for a selected node.

FIG. 7 depicts an example of a visualization GUI 90 in which (from the example of FIG. 4) a user has selected SITE3 node 52 and provide a user input to expand the details associated with such site node. The resulting graph 92 thus includes additional component nodes 94, demonstrated as Component_1 through Component_Q, where Q is a positive integer denoting the number of components in Site 3. The graph 92 also includes links 96 that connect each of the component nodes 94 with the SITE3 node 52. The links 96 represent the logical connectivity and associated status of the respective components 1 through Q at SITE3. The resulting graph 92 thus representing components and component status that form part of Site 3 as well represents connections and connectivity status for each of the respective components in Site 3. There could be any number of one or more components for a given site. In the example of FIG. 7, the SITE3 node 52 can operate similarly to the aggregation node 56 for the system in that it represents a virtual aggregation point for each of its components (Component_1 through Component_Q).

Figure 8:
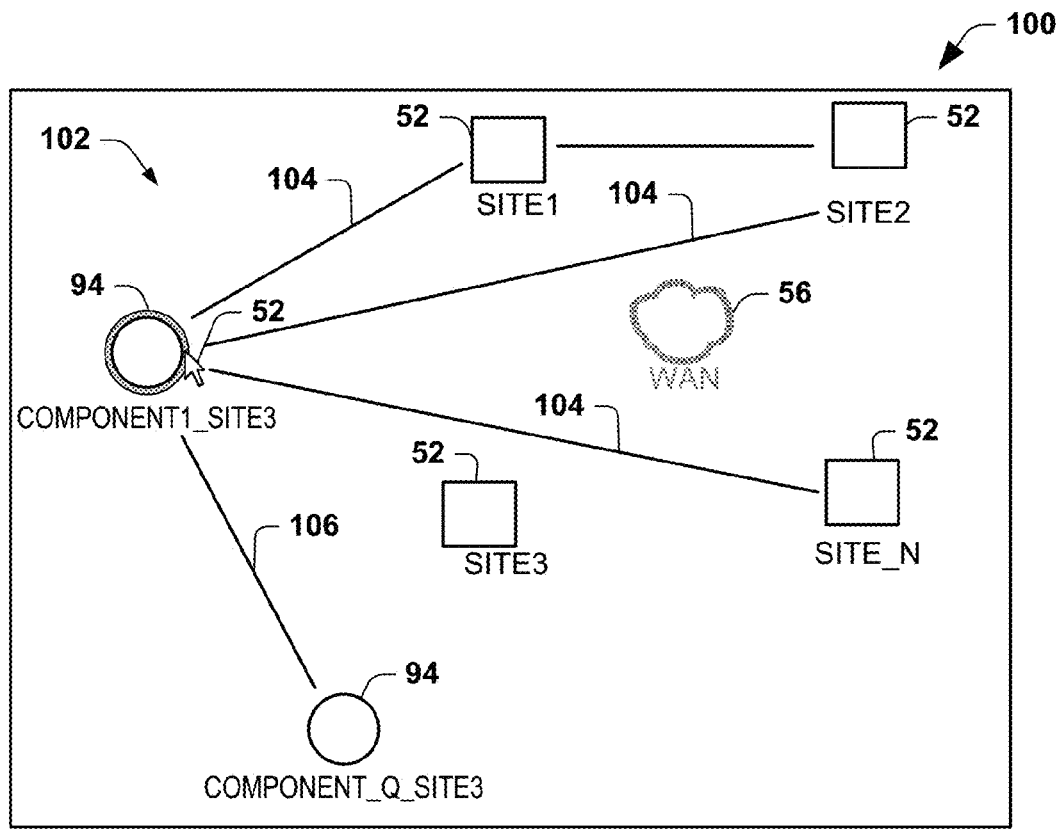
FIG. 8 depicts an example of a graphical user interface demonstrating logical connectivity for a selected component.

FIG. 8 depicts an example of another visualization GUI 100 that includes a graph 102 that can be generated in response to selecting a component for a given site. In the example of FIG. 8, the Component_1 of Site 3 has been selected, such as in response to user input via the pointer user interface element 64 to dynamically visualize connectivity and associated connectivity status of the selected node 94 (COMPONENT1_SITE3). Thus, in this example, the GUI 100 includes links 104 extending from the COMPONENT1_SITE3 node 94 to each of the other site nodes 52 including Site 1, Site 2 and Site N. The graph 102 also includes a component-to-component link 106 extending between COMPONENT1_SITE3 to COMPONENTQ_SITE3. The link 106 is provided because, as demonstrated in the example of FIG. 7, the site details for Site 3 had been expanded. The GUI visualization 100 thus includes component-to-site connectivity via links 104 as well as intra-site component-to-component level connectivity via the link 106. In each of the respective links 104 and 106, the connectivity status can represent aggregate connectivity from the perspective of the selected component, namely COMPONENT1_SITE3.

Figure 9:
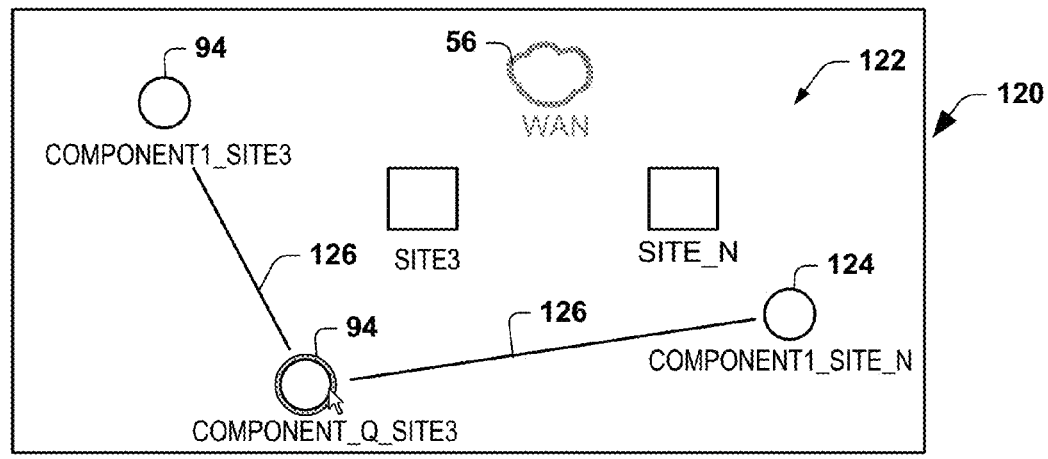
FIG. 9 depicts an example of a graphical user interface demonstrating component-to-component connectivity for a selected component.

FIG. 9 depicts an example of a visualization GUI 120 demonstrating an example of a component-to-component logical topology. For example, the GUI can be provided in response to selecting a given node (COMPONENTQ_SITE3) 94 and providing a user input to implement such connectivity (e.g., from the example GUI of FIG. 7 or 8). In the example of FIG. 9, the GUI 120 includes a graph 122 demonstrating connectivity for a component represented by the selected COMPONENTQ_SITE3 node 94 corresponding to Component N of Site 3. The graph 122 also includes the COMPONENT1_SITE3 node 94 and COMPONENT1_SITE_N node 124. The graph 122 also includes links 126 extending between COMPONENTQ_SITE3 node 94 and each of the COMPONENT1_SITE3 node 94 and COMPONENT1_SITE_N node 124. The status information represented by each of the links 126 includes connectivity status for associated connections from the perspective of Component_Q of Site 3 (e.g., unidirectional connectivity from the component Q to other components), which is the selected node. As an example, each of the components can be a server, switch or other component, such that the links 126 can represent to server-to-server links server-to-switch links, or switch-to-server links.

Figure 10:
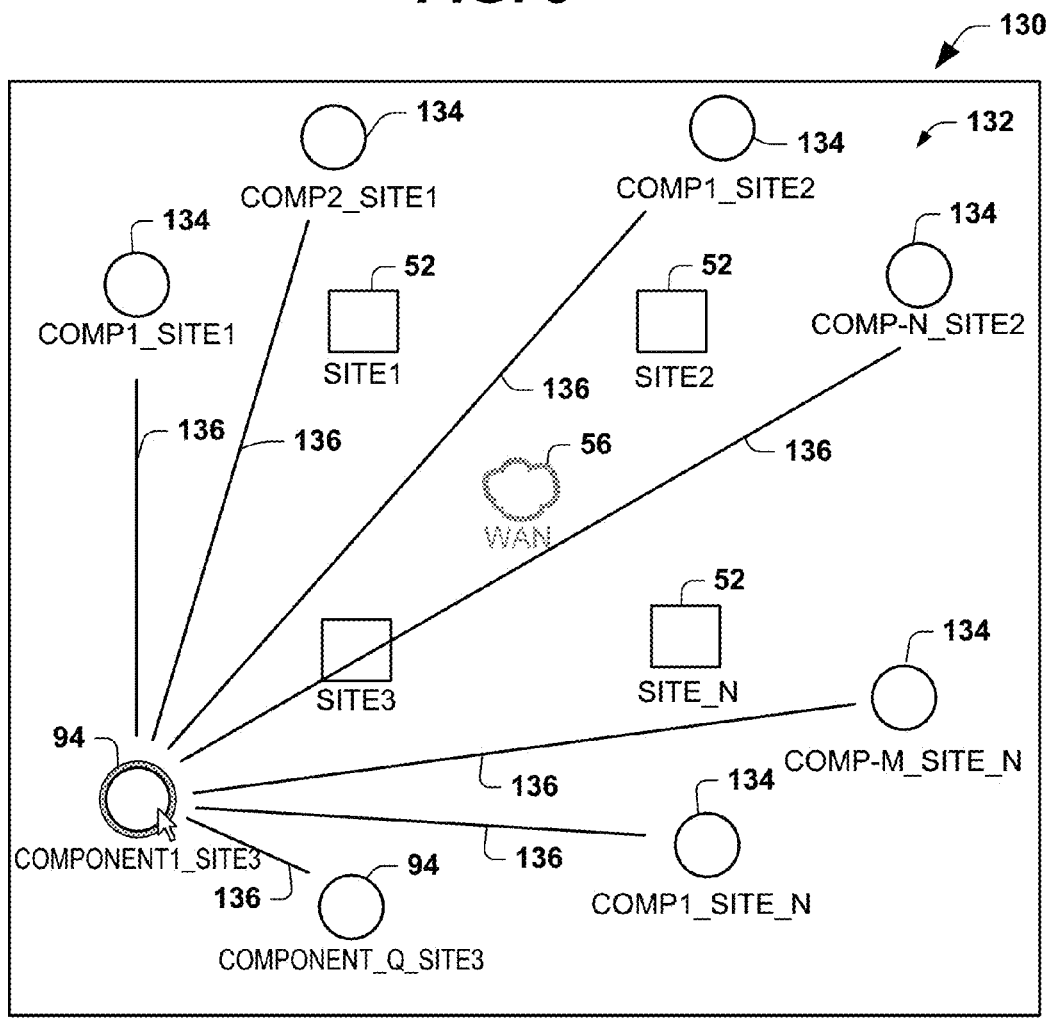
FIG. 10 depicts another example of component-to-component connectivity for a selected component.

FIG. 10 depicts another example of a visualization GUI 130 that includes a radial graph 132 demonstrating connectivity and associated status for a component (COMPONENT 1_SITE 3) represented by a selected node 94. In the example of FIG. 10, the COMPONENT 1_SITE3 node 94 is connected with other component nodes 134 via corresponding links 136. Thus, in the example of FIG. 0, component-to-component connectivity is shown from the perspective of the selected component (COMPONENT 1_SITE3) with respect to those components to which it is connected in the other sites. A corresponding intra-site link 136 also extends from COMPONENT 1_SITE 3 node 94 to the COMPONENT Q_SITE3 node 94. It is noted that in the example of FIG. 10, the link 136 between nodes 94 between Component_1 and Component_Q of Site 3 represents connectivity status from the perspective of Component_1 of Site 3 which has been selected. This can be contrasted with the example of FIG. 9 in which the link 126 between nodes 94 representing Component_1 and Component_Q of Site 3 represent connectivity status from the perspective of Component_Q of Site 3. As disclosed herein, the resulting connectivity status between the same nodes but for different selected nodes can be different. FIGS. 9 and 10 thus demonstrate that, in some examples, the connectivity status can provide unidirectional connectivity that depends on whether a given selected component can itself connect to another component and may not depend on whether any other component or node can connect to the selected component. In this way, diagnosis of potential problems associated with negative status information can be readily ascertained by a user. As disclosed herein, a given component can correspond to a switch, a server, a trunk group, or phones or the like such that the status demonstrated via the links 136 can demonstrate appropriate types of connectivity status.

Figure 11:
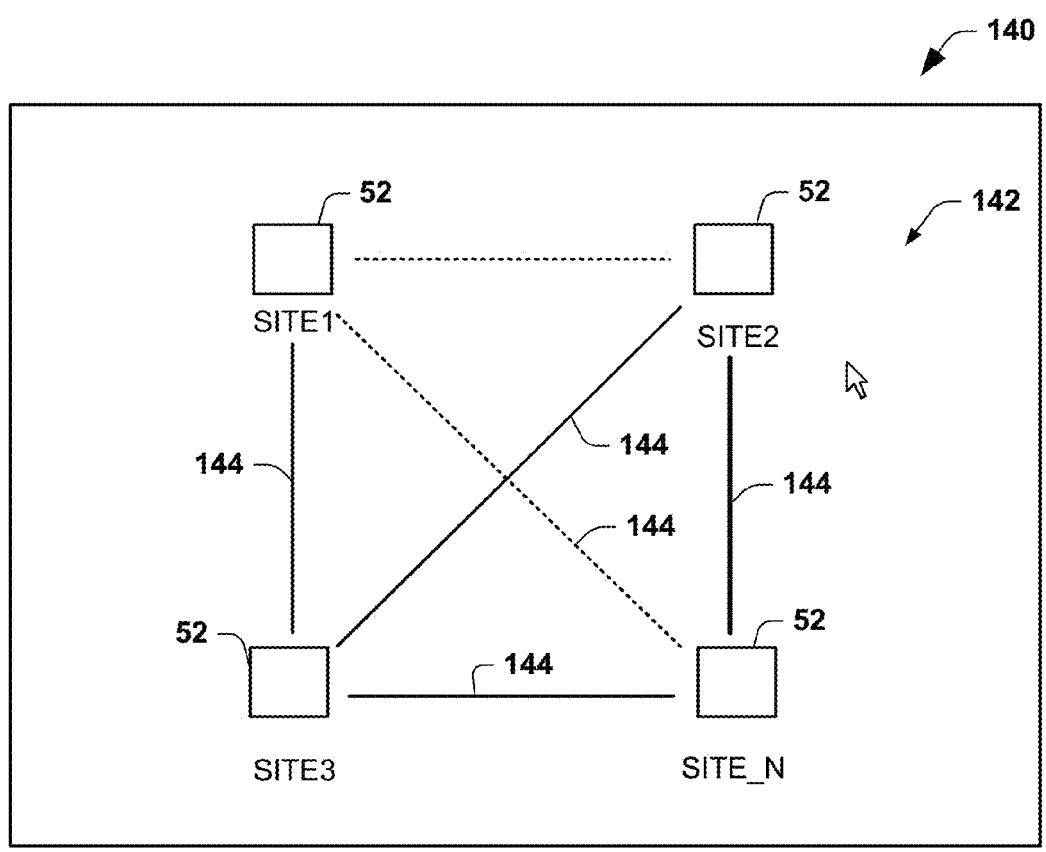
FIG. 11 depicts an example of a graphical user interface demonstrating a site-level mesh visualization.

FIG. 11 depicts an example of GUI 140 that includes a graph of nodes 52 representing respective sites to and disclosed in relation to FIG. 3. In the example of FIG. 11, the connectivity between the sites is demonstrated in the form of a mesh such as in response to selecting a "show site mesh" option from a corresponding drop down user interface element (e.g., menu 80 of FIG. 5). Thus in the example of FIG. 11 site-to-site connectivity and associated status between each respective node is demonstrated by corresponding links 144. As disclosed herein, each of the links 144 can include graphical features (e.g., color or the like) to indicate the status of the bi-directional connectivity between each of the site nodes 52. The site mesh view can be accessed, for example from any other visualization of the logical topology, such as disclosed herein. The site mesh graph 142 thus demonstrates a fully connected, bi-directional version of the site-to-site connectivity that was shown in FIG. 3.

Figure 12:
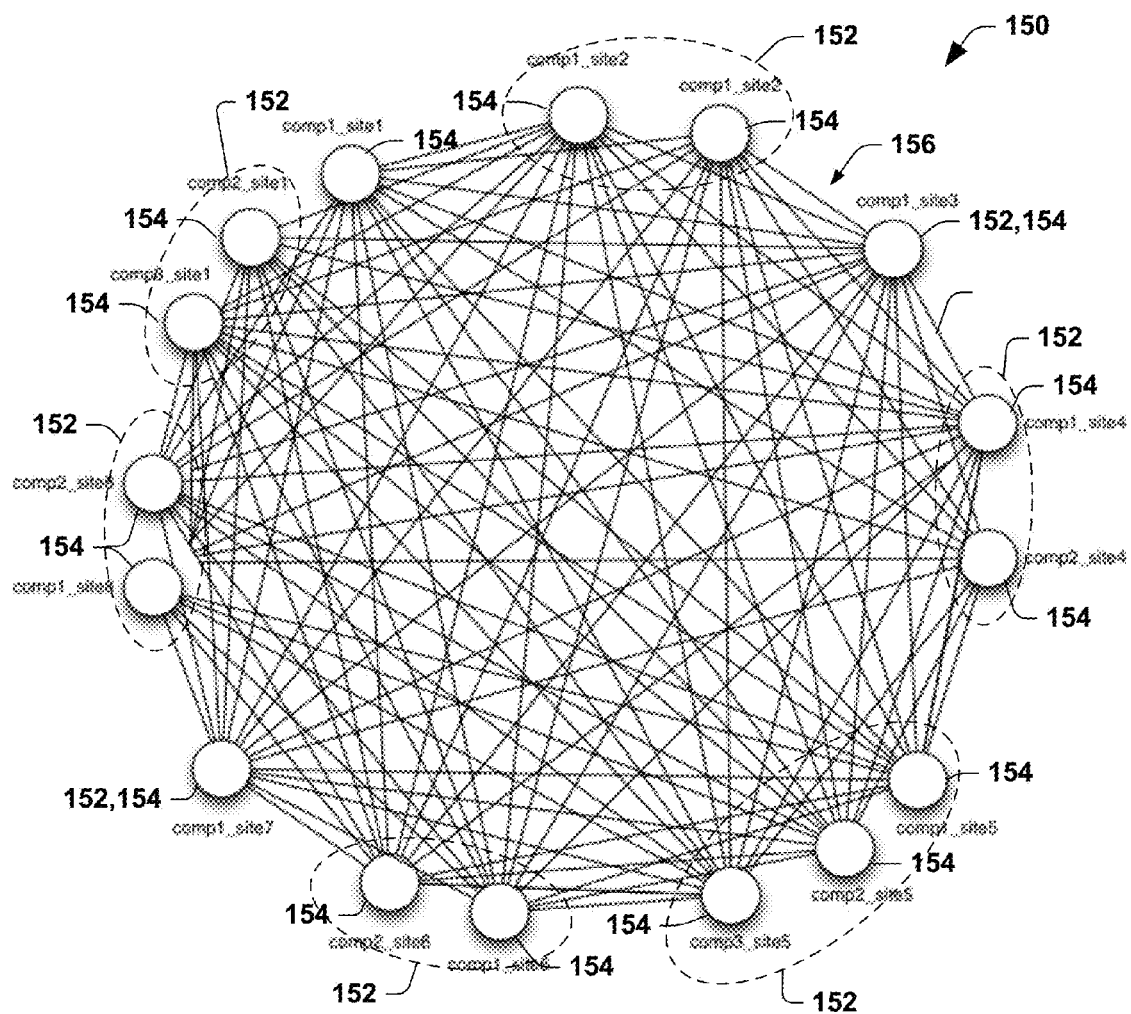
FIG. 12 depicts an example of a graphical user interface demonstrating a fully extended mesh visualization.

FIG. 12 depicts an example of a GUI 150 demonstrating a switch mesh view such as can be activated or launched in response to a user input such as disclosed herein (e.g., selected from a drop down menu, such as in FIG. 5). In the example of FIG. 12, switch-to-switch connectivity is demonstrated for all switches operating in the network system. The switches can be grouped into a respective container GUI element 152. Each container GUI element 152 thus can represent a respective site that includes one or more switches. The respective switches can be further identified within the container GUI elements 152 as corresponding switch nodes 154. Each node 154 thus can also be rendered in the GUI 150 to identify the status of the switch component represented thereby, such as disclosed herein. Each site container GUI element 152 can include one or more switch nodes 154 representing corresponding switches, which depends on the particular configuration of a given site. Connectivity and associated status of each switch connection are demonstrated as links 156 between respective switch nodes 154. The switch status for each link 156 can represent bi-directional connectivity status for each illustrated connection. The connectivity links 156 thus form a mesh representing each connection between switch pairs in the system.

Figure 13:
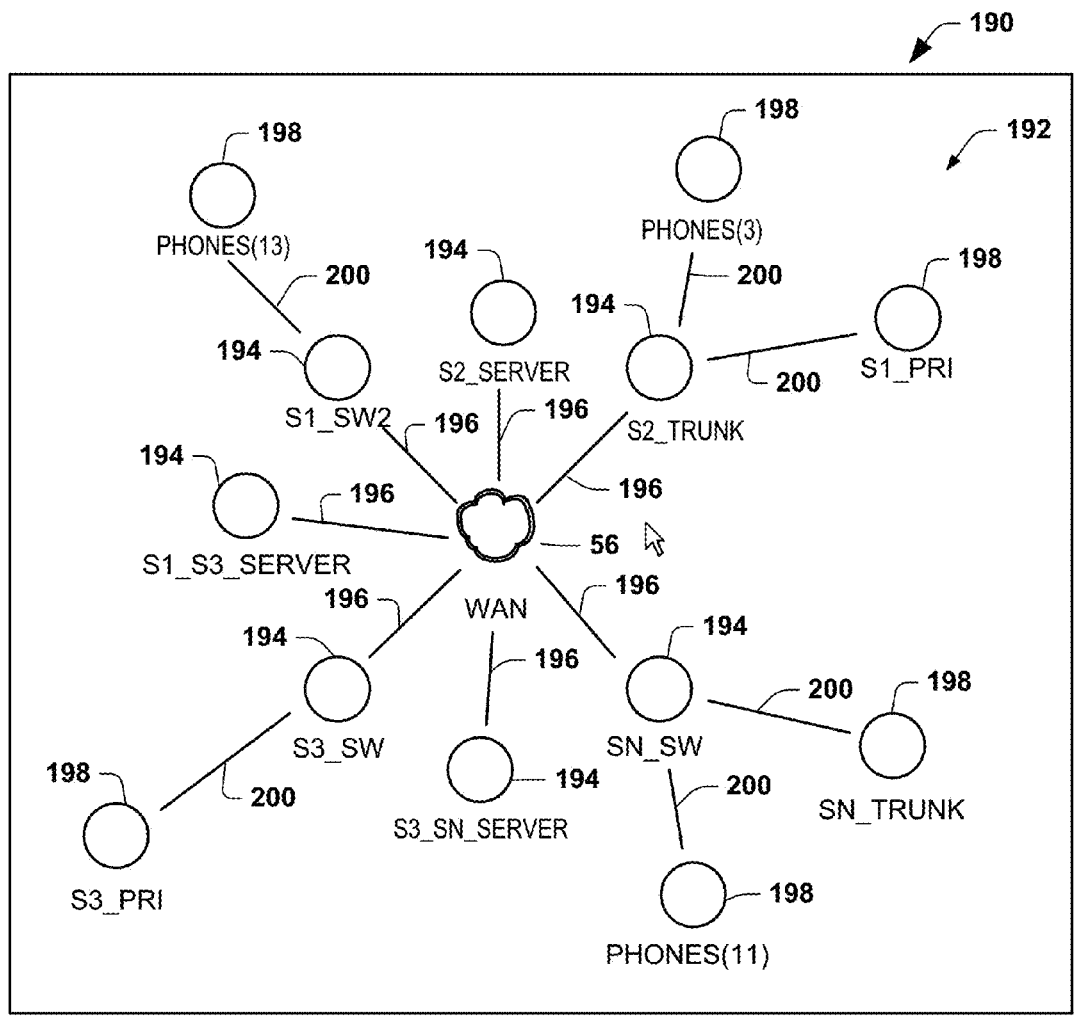
FIG. 13 depicts an example of a graphical user interface demonstrating a site-level topology visualization.

FIG. 13 depicts an example of a GUI 190 demonstrating a site topology graph 192. The site topology graph 192 provides a graphical inventory for each specific site including its configuration, connectivity, status and other assets that may be associated with a given site. Such assets can depend on the type of system being represented. For the example of a telecommunication system, the additional assets can include phones and trunk groups. For instance, a phone can correspond to any type of device capable of bi-directional audio and/or video communication such as a wired telephone (e.g., a digital phone, a desktop IP phone, a POTS phone or the like), a mobile phone, a videoconferencing terminal, a computer, an application running on a computer, and the like.

Thus, in the example of FIG. 13, the graph 192 includes an arrangement of switch and server nodes 194 for each of the sites in the system (e.g., Site 1, Site 2, Site 3 through Site N). The site nodes have been eliminated since the view is designed to demonstrate system inventory of physical assets.

In the graph 192, the component nodes 194 can be connected to the aggregation node 56 via corresponding link user interface element 196. Thus, similar to the example of FIG. 2, the links 196 represent combined connectivity for the respective components represented by the nodes 194 to all other components in the system to which they are (or should be) connected. Additionally, the links 196 can further represent connectivity status to sites and components external to the network system.

The graph 192 also includes asset nodes 198 that are connected with corresponding switch components via the corresponding links 200. The links 200 can provide connectivity status information. Alternatively, in other examples, the links 200 between asset nodes 198 and component nodes 194 may simply represent physical logical connections of the assets. In addition to identifying the type of asset represented by the nodes 198, descriptors can be provided on the graph, such as to identify a number of assets represented by each node. Other types of information can be included to provide additional inventory information that may be relevant to a user. A user may also drill down to obtain additional details, such as in response to a user input selecting a given node.

Figure 14:
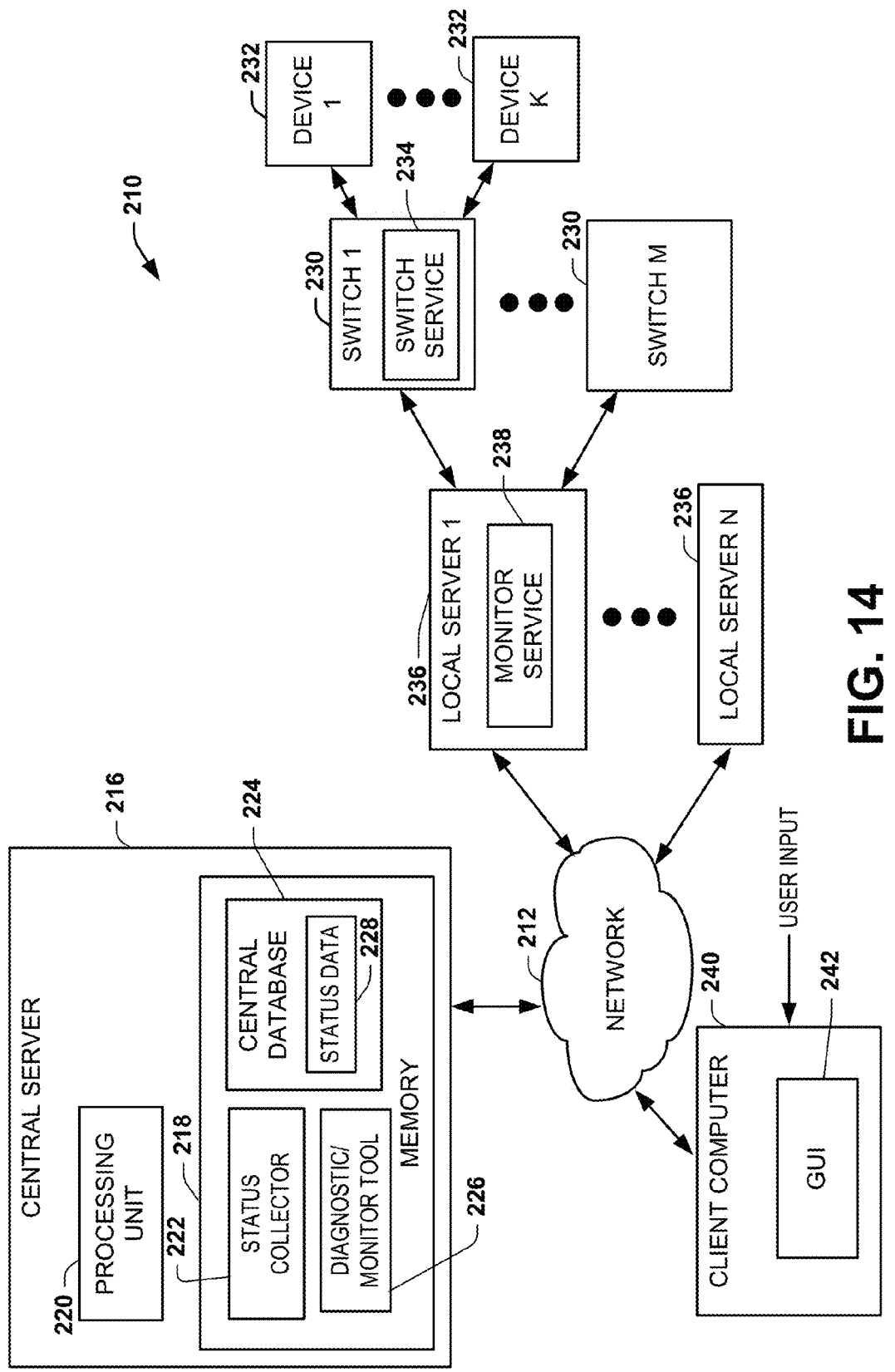
FIG. 14 depicts an example of a communication system that can implement a diagnostic and monitoring tool.

FIG. 14 depicts an example of a telecommunication system 210 that can be configured to implement an interactive visualization for a logical topology, such as may be part of a diagnostic and monitoring tool (e.g., system 10 of FIG. 1), as disclosed herein. The system 210 can include a central server 216 that could be implemented, for example, as a computer. As used herein, the term "central" is not intended to denote information about location, but instead refers to its hierarchical status in the system 210. The central server 216 can include a memory 218 for storing machine-readable instructions. The memory 218 could be implemented, for example, as volatile memory (e.g., random access memory), nonvolatile memory (a hard disk drive, a solid state drive, flash memory or the like) or a combination thereof. The central server 216 can also include one or more processing units 220 to access the memory 218 and execute the machine-readable instructions. The processing unit 220 can be implemented, for example, as including a processor core.

The memory 218 can include a status collector 222 that can be configured to collect status information from components or servers and store the information as status data 228. In some examples, the status data 228 can be stored in a central database 224 (e.g., a central repository) of the memory 218. It is to be noted that while the present example illustrates the central database 224 as being integrated with a central system, in other examples, the central database 224 could be implemented externally to the central system and/or be distributed throughout the system 210. In still other examples, servers or components in the system 210 may store status data directly in the database 224.

The system 210 can also include a diagnostic/monitor tool 226, such as corresponding to instructions and data programmed to provide an interactive visualization of a logical topology for the system 210. The diagnostic/monitor tool 226 can be programmed to perform functions disclosed in relation to the diagnostic and monitoring system 10 of FIG. 1 and as further disclosed with respect to the GUIs of FIGS. 2-13. Accordingly, reference can be made back to these other examples for information about the functionality of the diagnostic/monitor tool 226.

The system 210 can also include N number of local servers 236 that can communicate with the central server 216 via the network 212 (where N is an integer greater than or equal to one). Such an architecture can help mitigate a single point of failure since local servers can continue to collect data even if disconnected from the central server. Data can then be communicated once the connection has been reestablished. Each of the N number of local servers 236 can be implemented as a computer and, as mentioned with respect to the server 216, can include a processing unit and memory that stores instructions and data. For purposes of simplification of illustration, only contents of LOCAL SERVER 1 (hereinafter referred to as the "first local server 236") are included; however, each of the 2-N local servers 236 can be implemented in a similar manner. For example, the signaling between servers 216 and 236 can be implemented via a JavaScript Object Notation (JSON) message format, such as for sending status updates, notifications and commands as structured data over the network 212. Other forms of messaging or signaling can be used to communicate updates and other information within the system.

The first local server 236 can include a local monitor service 238 that executes on the first local server 236 (e.g., in a memory of the first local server 236). A plurality of producer components can be registered for operation in the system 210. As disclosed herein, the producer components can be any hardware and/or software component that is registered with the service for which the system can monitor or control its configuration and/or operation. For example, in the context of a telecommunication system, producer can include switches or communication devices, interfaces, voicemail service, telecommunication management service, a conference bridge service, an instant messaging service and the like.

In the example of FIG. 14, the monitor service 238 can communicate with M number of switches 230, where M is an integer greater than or equal to zero. For example, the local server 236 can be programmed to manage each such switch 230 and other devices 232. It is noted that in other examples, the first local server 236 and a switch 230 (or some subset thereof) can be collocated in a single appliance. As yet another example, the local server 236 can be utilized to provide one or more telecommunication services (e.g., voicemail service) within the system, and one or more switches 230 and other devices in the system 210 can be actively managed by one or more different servers (not shown).

As one example, the monitor service 238 can be implemented as a telecommunications monitor service (TMS) programmed to control and monitor the status of associated producer components 230 and 232. In some examples, the first local server 236 can communicate with each of the M number of switches 230 over a private network (e.g., a local area network). In other examples, the first local server 236 can communicate with each of the M number of switches 230 over the network 212. Additionally, the first local server 236 may communicate with the switches 230 via different networks, such as including one or more private networks as well as the network 212.

By way of example, each of the switches 230 can be implemented as a telephony switch that can route connections (e.g., telephone calls and/or data connections) to and from K number of the devices 232, where K is an integer greater than or equal to zero. A connection between the first local server 236 and each of the K number of switches 230 can be secured or unsecured. Each of the devices 232 could be implemented, for example, as a wired telephone (e.g., a digital phone, a desktop IP phone, a POTS phone or the like), a mobile phone, a videoconferencing terminal, a computer, an application running on a computer, and the like. While, for purposes of simplification of explanation, FIG. 14 only illustrates a set of device connected with the first switch 230 (labeled in FIG. 14 as "SWITCH 1"), it is to be understood that each the 2-N switch 230 could be implemented in a similar manner.

As a further example, each switch 230 can be implemented as hardware and/or software that channels incoming data from any of multiple input ports to a specific output port to take the data toward its intended destination. In the traditional circuit-switched telephone network, one or more switches are used to set up a dedicated though temporary connection or circuit for an exchange between two or more parties. On an Ethernet local area network (LAN) or a wide area network (WAN), the switch determines from an address in each incoming message packet which output port to forward the packet to, for example.

The first switch 230 can include a switch service 234 that executes on the switch 230. The switch service 234 can be implemented, for example, as a telephony service, such as a voicemail service. In such a situation, the switch service 234 can store voice mailboxes (e.g., as files) for each of the K number of devices 232, or some subset thereof. Each of the voice mailboxes can include, for example, personal information an associated user (e.g., PIN, a greeting or the like) for, as well as voice messages for the associated user.

In some examples, a given device 232 can be in continuous communication with the first switch 230, such as where the given device 232 is implemented as a wired telephone. In other examples, the given device 232 can be in intermittent communication with the first switch 230, such as examples where the given device 232 is implemented as a mobile phone or a smartphone. In either situation, the given device 232 can provide a status signal (e.g., a real-time status update) to the first switch 230. For instance, the status signal could indicate that the given device 232 is ready to receive and/or initiate a telephone or data connection with another device via the first switch 230, where the other device may or may not be coupled to the first switch 230.

The first local server 236 can also include one or more local services that can be implemented as a computer application for providing services to the M number of switches 230 and/or the K number of devices 232. Such services could include, for example, voice services, such as voicemail, conference bridging or the like. Operation of these and other services can be monitored by the monitor service to provide status updates for use by the diagnostic/monitor tool 226. As disclosed herein, the status data can include hierarchical status for components at each level that is managed by or within the context of the local server 236. For instance, the switches 230, devices 232 as well as applications executing within the system 210 can transfer status information to the local server 236.

The monitor service 238 of the first local server 236 can monitor the status of local services and components, including the switches 230 and devices 232. For instance, during initial setup, the monitor service 238 can poll the local services for configuration data and status data. The monitor service 238 can store the configuration data and the status data for the local service in a local database of the server 236. The local monitor service 238 can also poll each of the M number of switches 230 for configuration data and status data. The status data of the M number of switches can include a status of devices internal to the switches 230, such as a status of fans, trunk channels, logical software devices (e.g., route points or soft extensions) or the like. The status data can also include a status of the switch service 234 executing on the first switch 230. Upon receiving a response to the poll, the monitor service 238 can write the configuration data and the status data of each of the N number of switches 230 into the local database. The local database can be implemented as a child of the central database 224, such that the local database and the central database have a hierarchical relationship. Additionally or alternatively, in some examples, the monitor service 238 can send the data directly the central database 224.

Additionally, during normal operation after initial set up, the monitor service 238 of the first local server 236 can be programmed to monitor the status of each of the producer components registered with the local server 236, including the M number of switches 230 (and their associated internal devices), the switch service 234, each local service 234 and each device 232 registered therewith. The monitor service 238 thus can obtain real-time status for each of the producer components (e.g., 230, 232 and 234). The monitor service 238 can aggregate the real-time status information received from each local service 234, switches 230 and devices 232 and store such information in buffer and then send such information to the central database 224 to provide the status data 228.

As further example, the status information being aggregated for a given monitor service 238 of a given server 236 can correspond to those producers that operate within the context of the given server. In such an example, each server 236 can roll up that status information which it receives from its associated producer components. Thus, each server 236 can roll up its status information to the central database 224. The respective servers 236 can provide such status information to the central monitoring system periodically or asynchronously, which can vary, for example, depending on the type of status information being provided. The status collector 222 can further aggregate the status information that is rolled up from each local server and store aggregate status information as the status data 228 in the central database 224. The aggregate status information thus can provide a corresponding system level details of such status information that can be represented in the GUI.

As a further example, a given site can be a logical group of servers and producers that includes more than one switch 230, and different switches for the given site can be managed by different ones of the servers 236. The relationships and associated status for each component in a given site and for different levels of hierarchy can be maintained by the status data 228 stored in the central database 224.

In other examples, components, such as switches 230 or other devices 232 operating in the system 210, may communicate status information directly (e.g., without use of the monitor service 238) to the database 224 or status collector 222 to provide corresponding status data 228 that is used by the diagnostic/monitor tool 226. The mechanism utilized to collect and aggregate status data for the system can vary depending on the system design, the types of components and available services. The diagnostic/monitor tool 226 can operate regardless of the mechanism or mechanisms employed to generate the status data 228.

The diagnostic/monitor tool 226 can generate a system level visualization of such status information based on analysis of the status data 228, which can include up-to-date (e.g., real-time or substantially real-time) logical and physical connectivity status information for the system 210. The diagnostic/monitor tool 226 thus can glean a complete representation of status information across the system, including site level status, component level status and associated connectivity status. Additionally, by aggregating status information from different local servers 236 to provide such aggregate status information. The status collector 222 can perform a final aggregation of status information for each level of hierarchy in the system and store such aggregated status in the status data 228.

As mentioned above, the status collector 222 can monitor and maintain the overall status for the system 210, and the status data 228 can be stored in the central database 224. In some examples, a client computer 240 can be coupled to the network 212 and implement the diagnostic/monitor tool 226. The client computer 240 can be implemented, for example, as a desktop computer, a laptop computer, a mobile device (e.g., a tablet computer or a smartphone) or the like. The client computer 240 be configured (e.g., via an API) to access the functions supported by diagnostic/monitor tool 226. The client computer 240 thus can provide a graphical user interface (GUI) 242 that provides an interactive visualization of a logical topology for the system 210, such as disclosed herein. There can be any number of one or more client computers 240, each of which can implement an instance of the GUI 242.

By way of example, the GUI 242 can, in response to a user input (e.g., via a user input device, such as a mouse, keyboard, touch screen or the like), dynamically generating an interactive visualization of the logical topology for the network system 210 based on the accessed status data 228. As disclosed herein, the interactive visualization of the logical topology can include nodes and links arranged as a radial graph. As a further example, in response to a user input for a selected node, the GUI can dynamically regenerate the graph to represent the logical connectivity and associated status from a perspective of the component represented by the selected node. Other functionality and visualizations (see, e.g., FIGS. 2-13) can also be implemented via the GUI 242.

Figure 15:
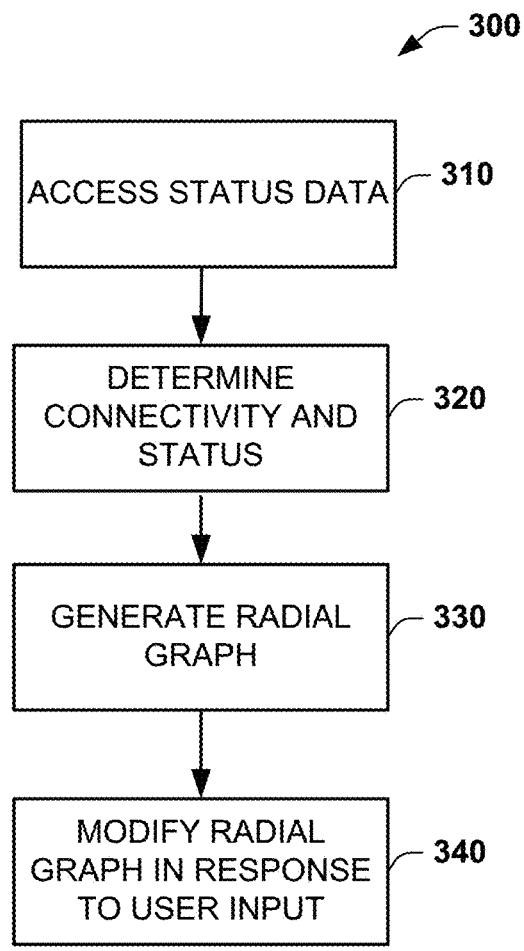
FIG. 15 is a flow diagram depicting an example of a method for implementing a graphical user interface for visualizing a logical topology.

In view of the foregoing structural and functional features described above, an example method will be better appreciated with reference to FIG. 15. While, for purposes of simplicity of explanation, the example method of FIG. 15 is shown and described as executing serially, the present examples are not limited by the illustrated order, as some actions could in other examples occur in different orders and/or concurrently from that shown and described herein. Moreover, it is not necessary that all described actions be performed to implement a method and other actions can be combined with those shown as disclosed herein. The example method of FIG. 15 can be implemented as computer-readable instructions that can be stored in a non-transitory computer readable medium, such as can be computer program product. The computer readable instructions corresponding to the method of FIG. 15 can also be executed by a processor (e.g., the processing unit 220 of FIG. 14).

FIG. 15 depicts an example of a method 300 for providing an interactive visualization (a GUI) of a logical topology. At 310, the method includes accessing a status data in database (e.g., status data 14 of FIG. 1 or status data 228 of FIG. 14) to acquire status information for a plurality of components in a telecommunication system. This can be done based on default (e.g., initial) parameters or in response to a user input via the GUI. The components can correspond to devices, applications and services implemented in the system such as disclosed herein. At 320, the method can include determining connectivity and status for the system (e.g., via connectivity and status logic 22 and 24, respectively, of FIG. 1). At 330, the method includes generating a radial graph (see, e.g., FIGS. 2-13) based on the acquired status information. The radial graph can include a plurality of nodes representing the plurality of components, and links representing logical connections as well associated status for the plurality of components. At 340, in response to a user input selecting a given node of the plurality of nodes, the method can include modifying the radial graph. For example this can include dynamically modifying the links in the radial graph to represent connectivity status information in the radial graph, based on the acquired status information. The connectivity and associated status information can be provided from a perspective of the selected given node.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
a memory configured to store machine readable instructions; and
a processing unit configured to access the memory and execute the machine readable instructions, the machine readable instructions comprising a graphical user interface (GUI) for visualization of a logical topology of the system, the GUI comprising:
a plurality of node user interface elements to represent respective components in the system, wherein a given node user interface element of the plurality of node user interface elements represents a physical site comprising a group of network components that are logically grouped together for operation of a particular purpose;
an aggregation node user interface element to represent a virtual aggregation point in the GUI through which the components represented by plurality of node user interface elements are logically connected;
a first plurality of link user interface elements, each connected between a node user interface element and the aggregation node, wherein at least one of the node user interface elements connected to the aggregation node is the given node; and
in response to a user input for a selection of the given node user interface element, the GUI being modified to:
eliminate the first plurality of link user interface elements connected to the aggregation node,
eliminate or render substantially transparent the aggregation node,
and connect a second plurality of new link user interface elements, each connected between the given node user interface element and each respective node user interface element previously connected to the aggregation node prior to the selection to represent the logical connectivity and associated aggregate network connectivity status from a perspective of the group of components represented by the given node user interface element while the plurality of node user interface elements remain fixed at their respective positions in the GUI.

2. The system of claim 1, wherein the aggregation node user interface element represents a data network.

3. The system of claim 1, wherein at least a portion of the plurality of node user interface elements correspond to sites of an enterprise network, and the GUI presents a corresponding radial graph visualization of the logical topology.

4. The system of claim 3, wherein the aggregation node user interface element operates as a logical convergence point for the corresponding radial graph visualization.

5. The system of claim 1, wherein in response to selecting the aggregation node user interface element, the node user interface elements and associated first link user interface elements are re-arranged to visualize a system-level logical topology for the system.

6. The system of claim 1, wherein each node user interface element includes a predetermined feature indicating status of at least one network component represented thereby.

7. The system of claim 1, wherein each of the first link user interface elements includes a predetermined feature to graphically represent a determined aggregate connectivity status of the logical connection represented thereby.

8. The system of claim 7, wherein the predetermined feature comprises a color selected from a plurality of predefined colors.

9. The system of claim 1, wherein the system is a telecommunication system in which at least some of the components are distributed throughout the system, and each of the components comprises at least one of a site, a server, a switch, a phone and a trunk group configured to operate in the telecommunication system.

10. The system of claim 1, wherein the associated aggregate network connectivity status for each respective node user interface element corresponds to a hierarchical status computed for the respective node.

11. The system of claim 1, wherein the associated aggregate network connectivity status for each respective first link user interface element corresponds to an aggregate network connectivity status determined for the respective first link user interface element based on associated aggregate network connectivity status information for each connection represented by the respective second link user interface element.

12. The system of claim 11, wherein the aggregate network connectivity status of each respective link user interface element is determined as only a unidirectional connectivity status of a bidirectional communication link from a perspective of a component represented by a selected one of the node user interface elements between which the respective second link user interface element extends.

13. The system claim 1, wherein the GUI is further configured to, in response to an expand user input to expand a corresponding node user interface element, generate at least one node user interface element and a second link user interface element extending between the corresponding node user interface element and the generated at least one node user interface elements to thereby logically represent producer components of the component represented by the corresponding node user interface element and the status of the producer components.

14. The system of claim 13, further comprising a second respective link user interface element extending between the corresponding node user interface element and each of the generated node user interface elements to represent logical connectivity and network connectivity status for the component represented by each of the generated node user interface elements.

15. The system of claim 14, wherein the node user interface elements represent a plurality of different types of components, each node user interface element comprising an icon to visually identify the type of component being represented.

16. The system of claim 13, wherein, in response to selecting one of the generated at least one node user interface element, the node user interface elements and the second link user interface elements being re-generated to represent the logical connectivity and associated network connectivity status from a perspective of the component represented by the selected generated node user interface element.

17. The system of claim 1, the GUI further comprising a feature applied to each node user interface element and first link user interface element to indicate a relative status and logical connectivity for each respective user interface element, the type of feature being selectable in response to a user input.

18. The system of claim 1, the GUI further comprising a diagnostic tool user interface element that is configured to activate at least one diagnostic function associated with at least one component or connection represented in the GUI in response to a user input to activate the at least one diagnostic function.

19. A non-transitory computer readable medium that stores instructions for performing a method comprising:
accessing status data for components of a network system, the status data including network connectivity status information aggregated for at least some of the components of the network system; and
generating an interactive visualization of a logical topology for the network system based on the accessed status data, the interactive visualization of the logical topology including nodes, an aggregation node, and first links arranged as a radial graph, the nodes representing components operating in the network system and associated status thereof, wherein a given node of the nodes represents a physical site comprising a group of network components that are logically grouped together for operation of a particular purpose, the aggregation node providing a virtual aggregation point in the interactive visualization through which the plurality of node user interface elements are logically connected, and the first links representing connectivity between the nodes and the aggregation node;
receiving a selection of the given node;
regenerating the interactive visualization by:
eliminating the first links connected to the aggregation node,
eliminating or rendering substantially transparent the aggregation node, and
connecting at least a portion of the nodes to the given node with second new links, each connected between the given node user interface element and each respective node previously connected to the aggregation node prior to the selection to represent the logical connectivity and associated aggregate network connectivity status from a perspective of the group of network components represented by the given node user interface element while the plurality of node user interface elements remained fixed at their respective positions in the interactive visualization.

20. The medium of claim 19, wherein the aggregation node represents a data network.

21. The medium of claim 19, wherein the aggregation node operates as a logical convergence point for a system topology visualization of the radial graph.

22. The medium of claim 19, wherein each node includes a predetermined feature to indicate a status of the component represented thereby, and each link includes a predetermined feature to indicate an aggregate connectivity status of the logical connection represented thereby.

23. The medium of claim 19, wherein the network system is a telecommunication system in which at least some of the components are physically and logically distributed, each of the components comprises at least one of a site, a server, a switch, a phone, and a trunk group configured to operate in the telecommunication system, the status for each respective link corresponds to aggregate status determined for the respective first link based on status information for each physical connection encompassed by the respective first link.

24. The medium of claim 19, wherein the associated connectivity status of each respective second link is determined as only a unidirectional connectivity status of a bidirectional communication link from a perspective of a component represented by a selected one of the nodes between which the respective second link extends.

25. The medium of claim 19, wherein in response to an expand user input to expand a corresponding node, the method further comprises generating at least one new node and new link extending between the corresponding node and the generated at least one new node, the at least one new node logically representing each producer component of at least one producer component operating within a context of the corresponding node, each new link representing logical connectivity and associated status for respective connections between each of the at least one producer component represented by each of new node and the component represented by the corresponding node.

26. The medium of claim 25, wherein, in response to selecting one of the at least one new node, the method further comprises re-generating second links between the selected new node and other nodes in the graph to represent logical connectivity and associated status from a perspective of the selected new node.

27. The medium of claim 19, wherein the method further comprises generating an alarm graphical user interface element to provide high-level status of components and services operating in the system based on detecting an alarm condition.

28. The medium of claim 19, wherein the method further comprises activating at least one diagnostic function to be performed on at least one user-selected component or connection represented in the graph in response to a user input.

29. A computer-implemented method comprising: accessing a monitoring database to acquire status information for a plurality of components in a telecommunication system;
generating a radial graph based on the acquired status information, the radial graph including a plurality of nodes representing the plurality of components, an aggregation node representing a virtual aggregation point through which the plurality of nodes are logically connected, and first links between each of the plurality of nodes and the aggregation node representing logical connections and associated status for the plurality of components, wherein a given node of the plurality of nodes represents a physical site comprising a group of network components that are logically grouped together for operation of a particular purpose; and
in response to a user input selecting the given node of the plurality of nodes, modifying the radial graph by:
eliminating the first links connected to the aggregation node,
eliminating or rendering substantially transparent the aggregation node, and
connecting a second plurality of new at least a portion of the nodes to the given node with links, each connected between the given node and each respective node previously connected to the aggregation node prior to the selection to represent logical connectivity status information and an associated network connectivity status in the radial graph, based on the acquired status information, from a perspective of the group of components represented by the selected given node while the plurality of nodes remained fixed at their respective positions in the radial graph.

30. The system of claim 1, wherein a transition from the disconnection of the first plurality of link user interface elements to the connection of the second plurality of link user interface elements is output as an animation over a plurality of frames.

* * * * *